United States Patent [19]

Bouhenguel

[11] Patent Number: 4,994,934
[45] Date of Patent: Feb. 19, 1991

[54] MICROCOMPUTER BASED RECLOSING RELAY

[75] Inventor: Redjem Bouhenguel, North Lauderdale, Fla.

[73] Assignee: ABB Power T & D Company Inc., Blue Bell, Pa.

[21] Appl. No.: 444,648

[22] Filed: Dec. 1, 1989

[51] Int. Cl.[5] .............................................. H02H 7/22
[52] U.S. Cl. ........................................ 361/71; 361/75; 361/92; 364/483
[58] Field of Search ....................... 361/23, 71, 72–75, 361/92; 364/483

[56] References Cited

U.S. PATENT DOCUMENTS

| | | | |
|---|---|---|---|
| 4,454,556 | 6/1984 | De Puy | 361/73 |
| 4,535,409 | 8/1985 | Jindrick et al. | 361/71 |
| 4,670,812 | 6/1987 | Doerfler et al. | 361/94 |
| 4,680,706 | 7/1987 | Bray | 361/75 |
| 4,931,890 | 6/1990 | Le Court | 361/73 |

Primary Examiner—Todd E. DeBoer
Attorney, Agent, or Firm—Richard V. Westerhoff

[57] ABSTRACT

A microcomputer based reclosing relay performs a number of sequences to generate a succession of reclosure signals for a circuit breaker at timed intervals. The digital processing unit of the relay maintains flags, counts and running times for generating the succession of timed reclosures in a volatile memory. Periodically, these flags, counts and running times are copied to a non-volatile memory such as an EEPROM. Upon restoration of power following an interruption of power which results in loss of the contents of the volatile memory, the digital processing unit recopies the flags, counts and running times saved in the non-volatile memory back into the volatile memory, so that the relay can resume generating the succession of reclosures from the point at which power was lost. The flags and counts are copied to the EEPROM only when they change state, while the running times are only saved once a second to prolong the service life of the EEPROM.

16 Claims, 6 Drawing Sheets

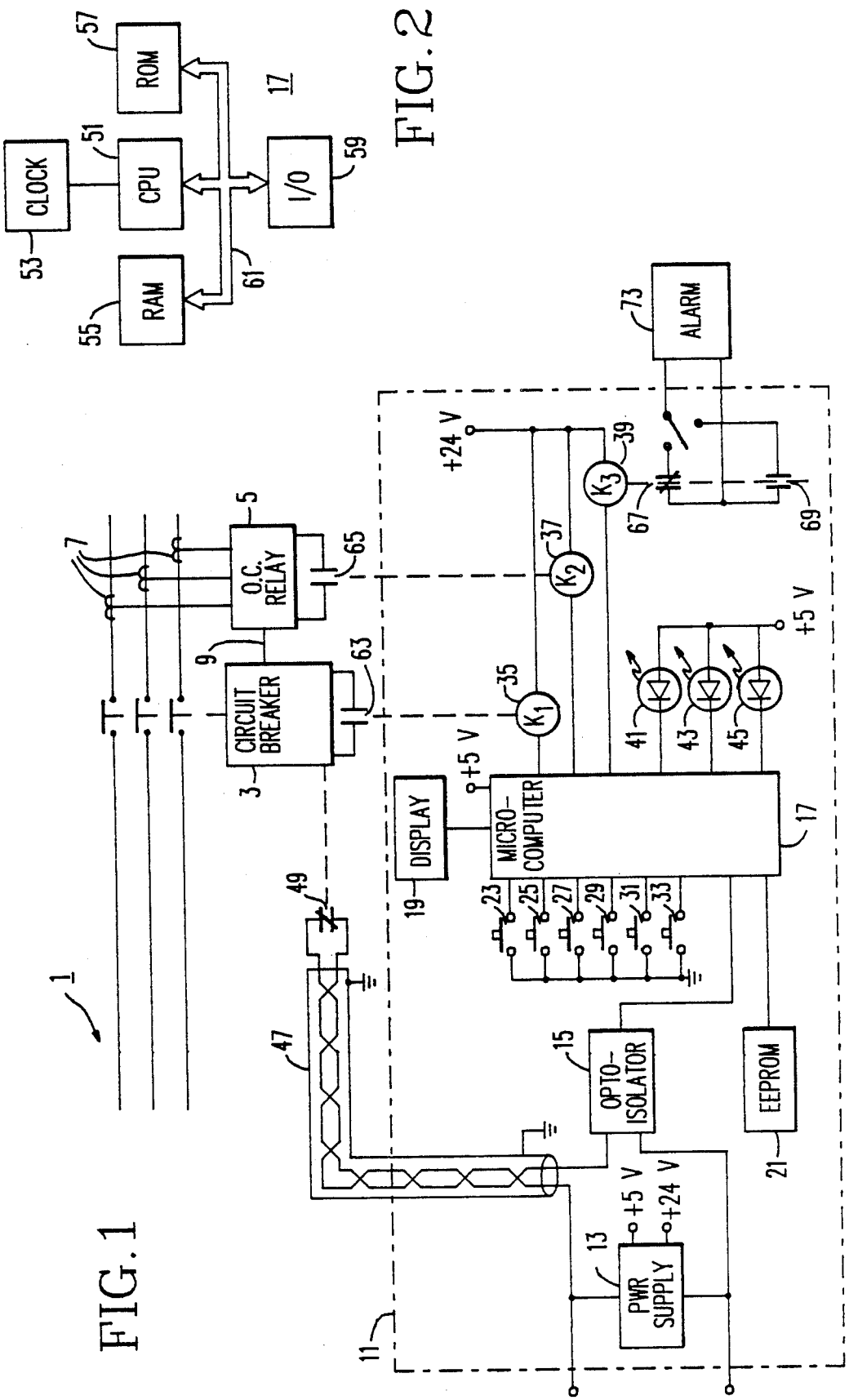

MICROCOMPUTER BASED RECLOSING RELAY

BACKGROUND OF THE INVENTION

1. Field of the Invention

This invention relates to reclosing relays which automatically reclose circuit breakers in electric power transmission and distribution systems after they have been opened by other protective relays. More specifically, it relates to a microcomputer based reclosing relay and particularly to aspects of such a relay which provide continuity of operation despite interruption in power to the relay microcomputer.

2. Background Information

Reclosing relays are commonly used to automatically reclose circuit breakers in electric power systems which have been opened by overcurrent or other protective relay action. Typically, the reclosing relay provides several reclosures at predetermined intervals in case the fault which initiated tripping of the circuit breaker takes time to clear and the circuit breaker does not remain closed in response to the first closure. The first reclosure is usually made without a delay since operating experience has shown that the majority of faults are of a temporary nature such as lighting flashovers, and will not be reestablished after an interruption of the fault current.

If the circuit breaker does not remain closed after the first reclosure, the relay makes additional reclosures at suitably graded intervals. It is common practice for the reclosing relay to make two additional reclosures. If the circuit breaker does not remain closed after the third reclosure, the reclosing relay goes to a lockout state, and manual action is required to reset the circuit breaker and the reclosing relay.

Conventionally, reclosing relays have been electromechanical devices While these devices are very reliable, they are not very flexible.

It is a primary object of the invention to provide a reclosing relay which can be more easily adapted to varying conditions.

It is also an object of the invention to provide such a reclosing relay which maintains continuity of operation despite interruption in power to the relay.

SUMMARY OF THE INVENTION

These and other objects are realized by the invention which is directed to a microcomputer based reclosing relay which includes a digital processor operated to perform a plurality of sequences, identified by sequence flags, which generate a preselected number of reclosure signals for a circuit breaker at timed intervals. The sequences include implementation of counters and timers. The relay includes volatile memory means in which the sequence flags, counts in the counters, and running times of the timers are maintained during use by the digital processor. The digital processor copies updated values of the flags, counts and running times into a non-volatile memory such as an EEPROM. Upon restoration of power following an interruption of power to the volatile memory which results in loss of the contents of the volatile memory, the digital processor recopies the flags, counts and running times from the non-volatile memory back into the volatile memory. The digital processor then resumes generating the succession of reclosing signals at the point where it left off when power was lost using the recopied flags, counts, and running times recopied from the non-volatile memory. Thus, in accordance with the invention, various working variables used by the digital processor in generating the succession of timed reclosing signals and which are maintained in volatile memory for use by the digital processor are periodically copied to a non-volatile memory so that upon restoration of power following a loss of power to the non-volatile memory, the digital processor can recopy the latest values of the working variables back into the volatile memory and can resume generating its succession of reclosing signals from the point where it was when power was lost.

The sequences performed by the digital processor include a lockout sequence in which no reclosure signals are generated. The lockout sequence is entered if the permitted number of reclosures have been attempted and the circuit breaker does not remain closed If a power-up to lockout option is selected, the relay goes to the lockout sequence upon restoration of power rather to the point where it left off in generating the succession of reclosure signals. However, if the circuit breaker remains closed for a selected interval after restoration of power, the digital processor transfers to a home sequence from which a complete new succession of reclosing signals can be generated if the circuit breaker again trips.

As another aspect of the invention, the relay includes a follow breaker feature in which closure of the breaker through other means, while the reclosing relay is timing a delay for generating a reclosure signal, is counted as a reclosure by the relay. This is an antipumping feature which prevents continued operation of the breaker on its own. By counting the self-closing of the breaker as a reclosure by the relay, the relay is advanced toward the lockout sequence which terminates further attempts at reclosure by the reclosing relay.

When an EEPROM is used as the non-volatile memory, the flags and counts in the counters are only copied to the EEPROM when they change state, and the running times in the timers are only entered into the EEPROM at spaced intervals of time while timing This is done to extend the life of the EEPROM which can only perform a given number of operations. In the exemplary system, the running times in the timers are copied to the EEPROM once each second.

BRIEF DESCRIPTION OF THE DRAWINGS

A full understanding of the invention can be gained from the following description of the preferred embodiment when read in conjunction with the accompanying drawings in which:

FIG. 1 is a schematic diagram of a portion of an electric power system incorporating the reclosing relay of the invention.

FIG. 2 is a schematic diagram in block form of the microcompute which forms part of the reclosing relay shown in FIG. 1.

DESCRIPTION OF THE PREFERRED EMBODIMENTS

Figure 3A:
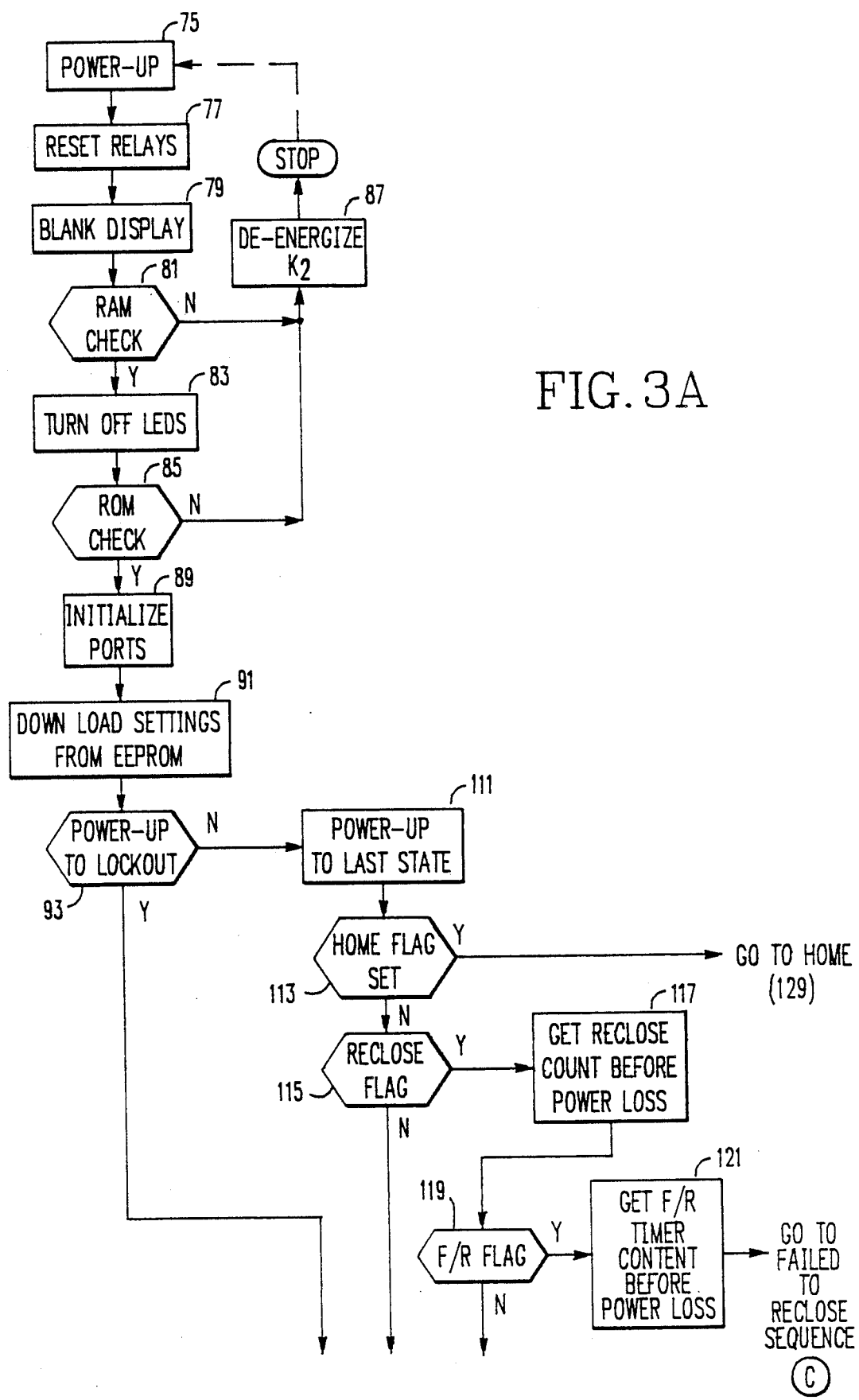
FIGS. 3 through 6 are flowcharts for a program suitable for implementing the invention in the microcomputer shown in FIG. 2.
Figure 3B:
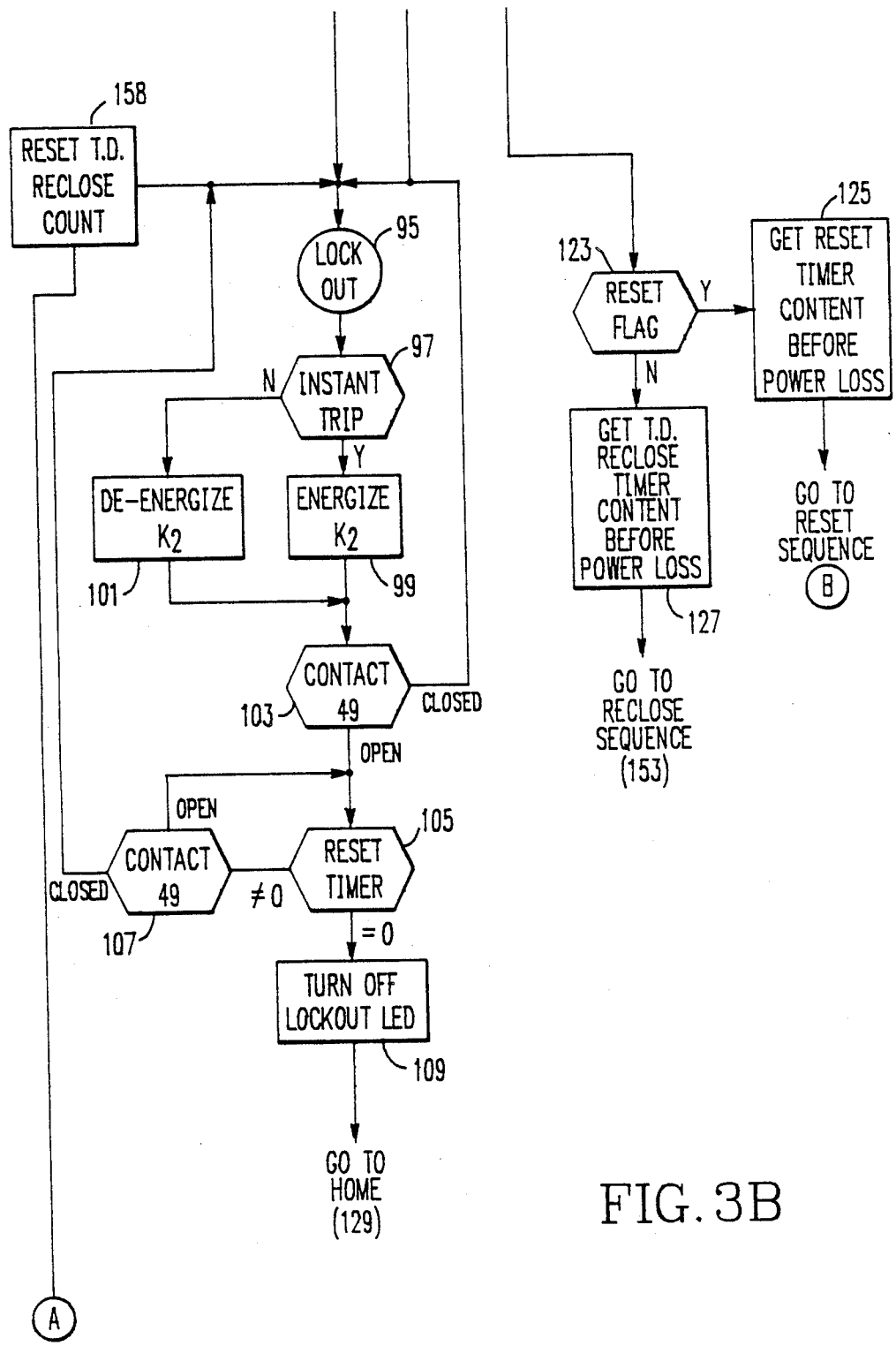

Referring to FIG. 1, a three-phase segment of an electric power system 1 is protected by a circuit breaker 3. Tripping of the circuit breaker 3 is controlled by a protective relay, such as for example, the overcurrent relay 5. The overcurrent relay 5 monitors the current in each phase of the power system 1 through current monitors 7. If the current in the protected segment of the electric power system 1 exceeds limits set by the overcurrent relay 5, a trip signal is sent to the circuit breaker 3 over the lead 9. Other types of protective relays can be used to trip the circuit breaker 3.

Reclosure of the circuit breaker 3 is controlled by the reclosing relay 11 of the invention. The reclosing relay 11 includes: a power supply 13, an opto-isolator 15, a microcomputer 17 with a display 19 and a non-volatile memory in the form of an electronically erasible programmable read only memory (EEPROM) 21; input push button switches 23, 25, 27, 29, 31 and 33; output relays 35, 37 and 9; and LEDs 41, 43 and 45.

The power supply 13 generates regulated +5 volt dc power for the microcomputer 17 and LEDs 41, 43 and 45 and +24 volt dc power for the relays 35, 37 and 39, from either an ac or dc external source. The external source also provides power through a shielded twisted pair cable 47 to a normally closed switch 49 which generates a signal representative of the open/closed state of the circuit breaker 3. The opto-isolator 15 converts this circuit breaker state signal to an isolated +5 volt logic signal for input into the microcomputer 17. The switch 49 is closed when the circuit breaker 3 is open.

As shown in FIG. 2, the microcomputer 17 includes a central processing unit (CPU) 51 controlled by a clock 53, a non-volatile read only memory (ROM) 55, a random access memory (RAM) 57, and an input/output (I/O) unit 59 interconnected by a communications bus 61. The ROM 55 is a non-volatile memory in which the program for the microprocessor is stored. The RAM 57 is a volatile working memory in which working variables and data used and generated by the central processing unit are stored. By volatile, it is meant that the information stored in RAM 57 is lost when power to the RAM is interrupted. Ordinarily this would necessitate that the microcomputer start from some set initial condition when power is restored; however, in accordance with the invention, the microcomputer 17 can resume operation from where it left off when power was lost. The input/output unit 59 allows the microcomputer 17 to communicate with the other components of the system. This includes the EEPROM 21 which, as will be seen, stores settings used by the microcomputer 17 and also variables whose values are affected by operation of the microcomputer. As previously mentioned, the EEPROM is non-volatile memory, meaning that it retains stored information indefinitely with or without power. The stored information can be readily changed, however, and in fact, variables used by the microcomputer are updated in the EEPROM 21 on a repetitive basis.

In addition to the open/closed input signal from the circuit breaker, the microcomputer 17 receives inputs through the push button switches. The switch 23 is a test switch which permits the operator to initiate a computer test. The "select/run" button 25 permits the operator to select a function and when pushed again to enter the "run" mode. The "lower" and "raise" buttons 27 and 29 allow the operator to scroll through functions or to decrease and increase, respectively, the values of parameters. With the "set/enter" push button 33, the operator can designate a parameter to have its value changed by the "raise" and "lower" buttons, and by subsequent actuation to enter the selected value into the microcomputer. With the "failed reclose reset" button 33, the operator can reset the failed to reclose LED 45.

The microcomputer 17 also receives settings from the EEPROM 21, and as will be seen periodically, transmits values for storage in the EEPROM 21. The microcomputer 17 has two types of outputs, the coils 35, 37, and 39 of output relays $K_1$, $K_2$ and $K_3$, respectively, and the LEDs 41, 43 and 45. The relay $K_1$ is the close relay. The coil 35 of this relay is energized when the microcomputer 17 generates a reclose signal for the circuit breaker. Energization of the coil 35 results in closure of the normally open contacts 63 in the control circuit of circuit breaker 3 to initiate closure of the circuit breaker. The $K_2$ relay is an instantaneous trip relay. When the instantaneous trip function is selected by the microprocessor 17, the coil 37 of this relay is energized to close the normally open contacts 65. These contacts 65 are in parallel with time delay contacts within the protective relay 5 (not shown). Thus, when these contacts are closed, the circuit breaker is tripped instantaneously without the delay provided by the overcurrent relay 5.

The $K_3$ relay is an alarm relay. The coil 39 of this relay is normally energized, but is deenergized when microcomputer 17 detects an alarm condition. The $K_3$ relay has one set of normally closed contacts 67 and one set of normally open contacts 69. Either of these contacts can be selected by a jumper 71 to activate an alarm 73. The position of jumper 71 is selected dependent upon whether the alarm 73 is to be energized or deenergized for the alarm condition. The display 19 is a two-line, 16-character per line, liquid crystal display used for displaying the sequence of relay operation, including timing and failure modes, as well as parameter settings.

The reclosing relay 11 has several operating states or sequences it performs. Most of the time, the relay is in an inactive, rest condition, called, HOME. The reclosing relay also has a RECLOSING state in which reclosings are timed, a state in which the relay is waiting for the circuit breaker to respond to a RECLOSURE signal, and in which it detects failure of the circuit breaker to close within a selected interval, hence called the "FAILED RECLOSURE" state, and a RESET state in which the reclosing relay determines if the circuit breaker is going to remain closed. The reclosure relay also has a LOCKOUT state in which automatic reclosure is prevented.

The reclosing relay 11 can be programmed to attempt up to four reclosures of the circuit breaker, each at a separately settable predetermined time interval. If the circuit breaker fails to remain closed after the last reclosure, the relay goes to the LOCKOUT state, and any further attempts at reclosure must be made by manual operation.

Typically, the protective relay 5 may be provided with a delay in tripping the circuit breaker. The reclosing relay 11 can be operated, if desired, to provide instantaneous tripping of the circuit breaker by energization of the relay $K_2$ which closes the contact 65 to bypass the protective relay delayed trip. The reclosing relay 11 can be operated to provide instantaneous trips when in LOCKOUT, and can also operate the contact 65 to permit a selected number of the trips between reclosures to be instantaneous.

The reclosing relay 11 includes two counters and several timers. The first counter keeps track of the reclosures and the second counter counts the number of instantaneous trips. The timers include four reclose, or time delay, timers which time the delays for the four reclosures. They start timing when the contacts 49 on the circuit breaker close indicating that the circuit breaker has been tripped. When one of these timers times out, the $K_1$ relay is energized to initiate reclosure of the circuit breaker. Another timer is the RECLOSE FAILURE timer which, if selected, times the interval required for the circuit breaker to reclose after the reclose signal is generated. If the circuit breaker fails to reclose within the selected time interval, the reclosing relay goes to LOCKOUT.

An additional third timer of the reclosing relay is the reset timer which begins timing when the circuit breaker closes. If the circuit breaker remains reclosed until the reset timer times out, the circuit breaker goes to the HOME state. If the circuit breaker reopens before the reset timer times out, another reclosure is attempted. Timing out of the reset timer is an indication that the event which caused the circuit breaker to trip initially has terminated. This could occur after any one of the reclosures. In returning to the HOME state the counters and timers are reset for the next event. The reclosing relay also includes a maximum cycle timer which begins timing when the circuit breaker first trips. This timer is set for an interval which exceeds the maximum time that would be required for the circuit breaker to go through a full succession of time delayed reclosures. Thus, timing out of this timer is an indication of a malfunction and the relay goes to LOCKOUT.

The number of reclosures, the timing intervals, and various options are fully selectable as indicated in the following Table 1.

TABLE 1

| FUNCTION | VALUE |
| --- | --- |
| Reclosure to LOCKOUT | 0 to 4 |
| Instantaneous Trip Enable | 0 to 4 |
| First Reclose Timer, sec | 0 to 250 |
| Second Reclose Timer, sec | 0 to 250 |
| Third Reclose Timer, sec | 0 to 250 |
| Fourth Reclose Timer, sec | 0 to 250 |
| Follow Breaker | Yes or No |
| Reset Timer, sec | 0 to 250 |
| Instantaneous Trip from LOCKOUT | Yes or No |
| Fail Reclose Enable | Yes or No |
| Reclose Fail Timer, sec | 0 to 250 |
| Max Cycle Enable | Yes or No |
| Maximum Cycle Timer sec | 0 to 999 |

These various functions can be called up on the display 19 one at a time and the values set by the operator. Table 1 shows the range of values that can be selected. For instance, up to four reclosures are available, and if desired each can be an instantaneous trip. If less than the number of reclosures are selected for instantaneous trip, the instantaneous trips are selected for the earliest reclosures. As can be seen, the delay for each reclosure can be independently selected by setting the appropriate reclose timer. Various options can also be selected, such as "follow breaker", which is explained below, and "instantaneous trip from lockout." If "fail reclose enable" is selected, the relay goes to lockout if the circuit breaker does not close within the interval set by the "reclose fail timer." As can also be seen, the maximum cycle timer is an optional feature.

The microcomputer 17 of the reclosing of relay 11 maintains the contents of the counters and timers in the RAM 57. It also maintains in the RAM, software flags for the different stages or sequences of operation. That is, a flag for HOME, a flag for RECLOSURE, a flag for RESET, a flag for FAILED TO RECLOSE, and a flag for each output contact. Since the RAM 57 is a volatile memory, this information is lost if power to the microcomputer 17 is interrupted. However, in accordance with the invention, loss of the information in the RAM 57 is precluded by operating the microcomputer 17 to repetitively write the count in the counters, the running times in the timers and the flags to the EEPROM 21. In the exemplary system, the flags and counts in the counters are only copied to the EEPROM when they change state while the running times in the timers are only copied once each second during timing operations. While the cycle time of the microcomputer 17 is much higher and thus the timers are being incremented at a much higher rate, timing information is transferred to the EEPROM 21 only every second to prolong the service life of the EEPROM. When power to the relay is lost, the point in the reclosing sequence is remembered in the EEPROM by saving appropriate flag, counter count, timer content and contact output state. Then upon restoration of power, the relay will resume operation at the point where the power was lost and re-establish the relay status as if there was no power loss.

FIGS. 3 through 6 illustrate flow charts for a suitable computer program for operating the microcomputer 17 of the reclosing relay 11 in accordance with the invention. As can be seen from FIG. 3, on power up at 75, the relays $K_1$ through $K_3$ are reset at 77 and the liquid crystal display 19 is cleared at 79. If a RAM check is passed at 81, the LEDs 41, 43, and 45 are turned off at 83 and a ROM is check is made at 85. If either the RAM check of ROM check are failed, the coil 39 of the alarm relay $K_3$ is deenergized to actuate the alarm circuit 73, as shown at 87. Operation of the microcomputer 17 then stops until an operator intervenes.

If all of the checks are passed, the microcomputer ports are initialized at 89 and the settings are downloaded from the EEPROM 21 as indicated at 91. The settings downloaded include the selected parameters from Table 1 above, and the stored values for the flags and timers.

The microcomputer 17 is then ready for operation. The first item that is checked is whether the feature "power up to lockout" has been selected as determined at 93. If it has, the LOCKOUT LED 41 is turned on at 95. If the instantaneous trip from LOCKOUT feature has been selected as determined at 97, the $K_2$ relay is energized at 99; otherwise, it is deenergized at 101. The computer then monitors the contact 49 at 103 to determine if the circuit breaker is opened or closed. If the contact 49 is closed indicating that the circuit breaker is tripped, the program loops back to 95. However, if the circuit breaker is closed as indicated by open contacts 49, the reset timer is started at 105. If the circuit breaker remains closed as determined at 107, until the reset timer times out, the LOCKOUT light is turned off at 109 and the program goes to HOME. However, if the circuit breaker 3 opens, as determined at 107, before the reset timer times out, the program remains in the LOCKOUT routine.

If power-up to LOCKOUT was not selected, as determined at 93, the power-up to last state routine 111 is selected. If the HOME flag is set at 113, the program goes to HOME. If the system was not at HOME at the time of the power failure, the reclose flag is checked at 115 to determine if the relay was going through a reclose sequence at the time of power failure. If not, and since it was also not in HOME, it had to be in LOCKOUT, and the program returns to the LOCKOUT sequence.

If the relay was going through a reclose sequence at the time of the power failure, the number of reclosures performed before the power loss is downloaded from the EEPROM 21 at 117. Next, it must be determined what point of the reclose cycle the system was in at the time of the power failure. If the failed to reclose flag is present at 119 indicating that the relay had sent a reclose signal to the circuit breaker and was waiting for the circuit breaker to respond, the contents of the failed to reclose timer are downloaded at 121 and the program goes to the failed to reclose sequence If instead, the circuit breaker had closed and the relay was timing the interval that the circuit breaker had remained reset, as determined by the presence of the reset flag at 123, the contents of the reset timer are downloaded at 125, and the program goes to the reset sequence. If neither the failed to reclose flag nor the reset flag are set, then the relay was timing the interval for reclosure and the contents of the timed delay reclose timer are downloaded at 127, and the program transfers to the reclose sequence.

Figure 4:
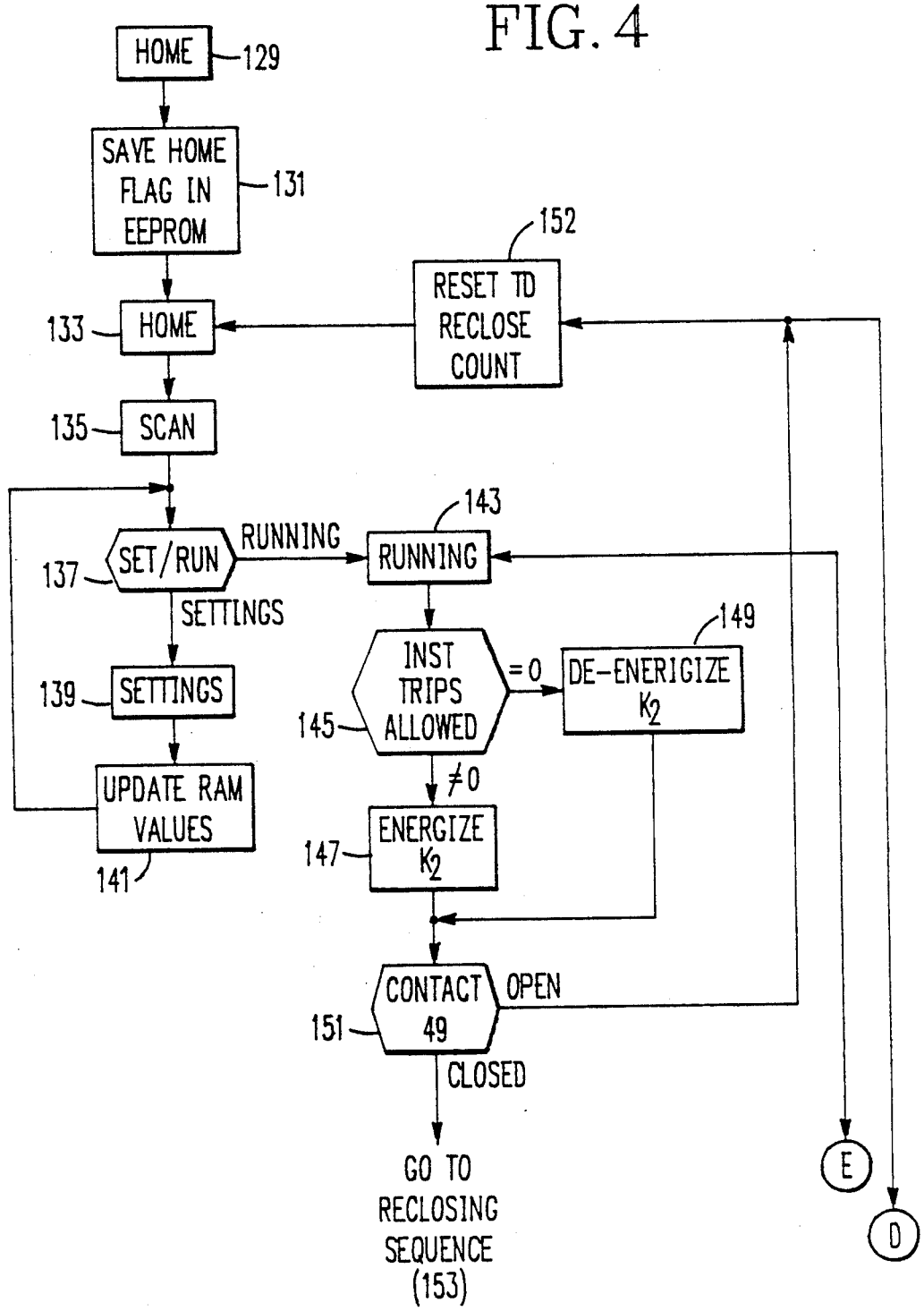

The program enters the HOME routine at 129 in FIG. 4 and the HOME flag is saved in the EEPROM at 131 and the HOME LED 43 is turned on at 133. The input switches are then scanned at 135. If the "select/run" button 25 has been actuated to call up the "select" function, as determined at 137, the settings for the relay may be changed by the operator at 139. To perform this function, the operator can use the "lower" and "raise" buttons 27 and 29 respectively to scroll through on the display 19 the functions listed in Table 1. When the function to be changed is displayed, the "set/enter" button 31 is depressed and the operator may then use the "raise" and "lower" buttons to change the value of the function. The desired value is then entered by again pressing the "select/enter" button 31 and the new value is stored in the EEPROM. When all the desired changes have been made, the updated values are entered in the RAM 141. If the button 25 is again depressed to select the run function, the program enters the run subroutine at 143. The number of instantaneous trips allowed is checked at 145, and if there are still instantaneous trips left, the K₂ relay is energized at 147; otherwise, it is deenergized at 149. The status of the circuit breaker is then monitored by checking the contact 49 at 151. If the contact 49 is open indicating that the circuit breaker is closed, the timed delay reclose timer is reset at 152 and the program remains in the HOME routine. Otherwise, it goes to the reclosing sequence.

Figure 5:
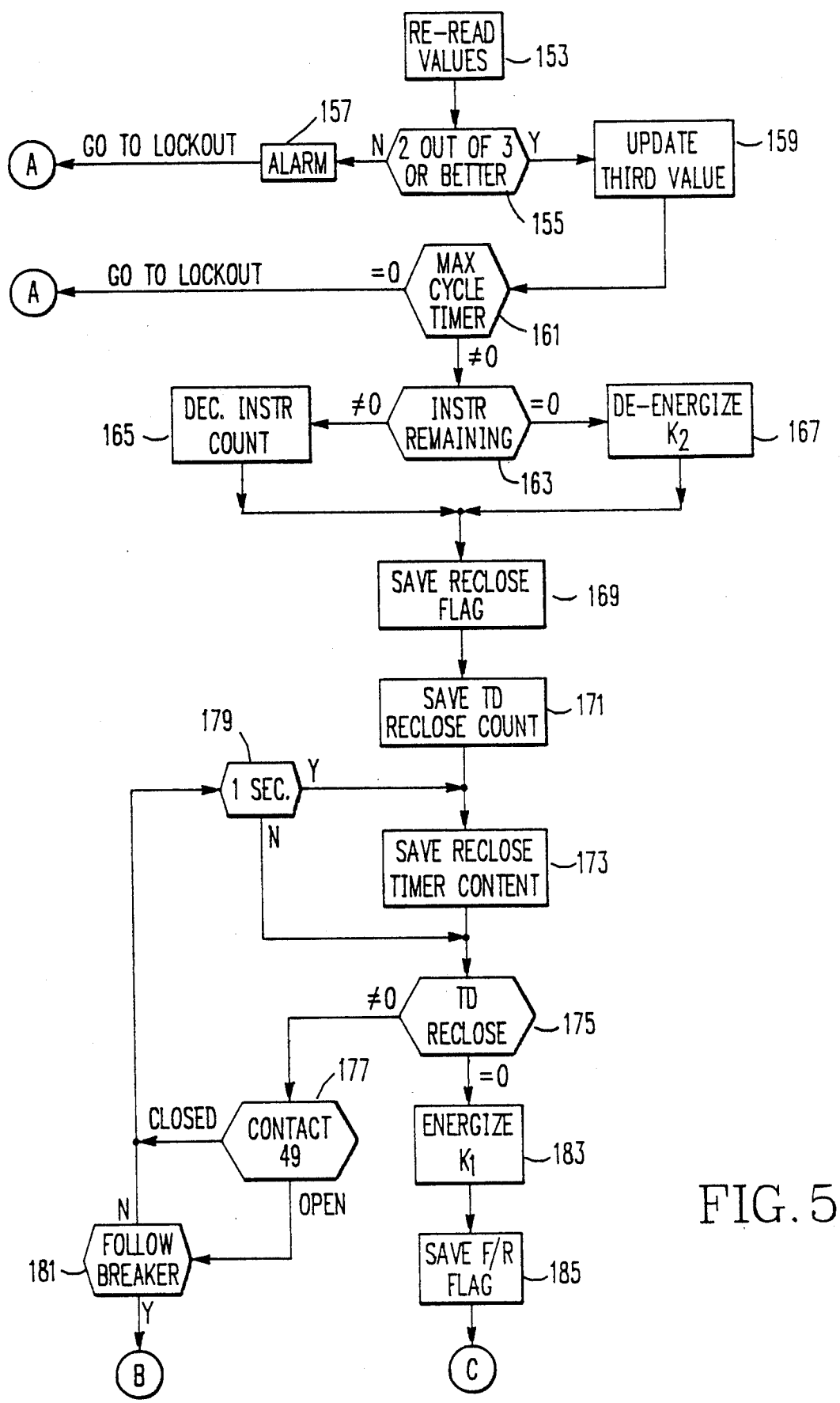
Figure 6:
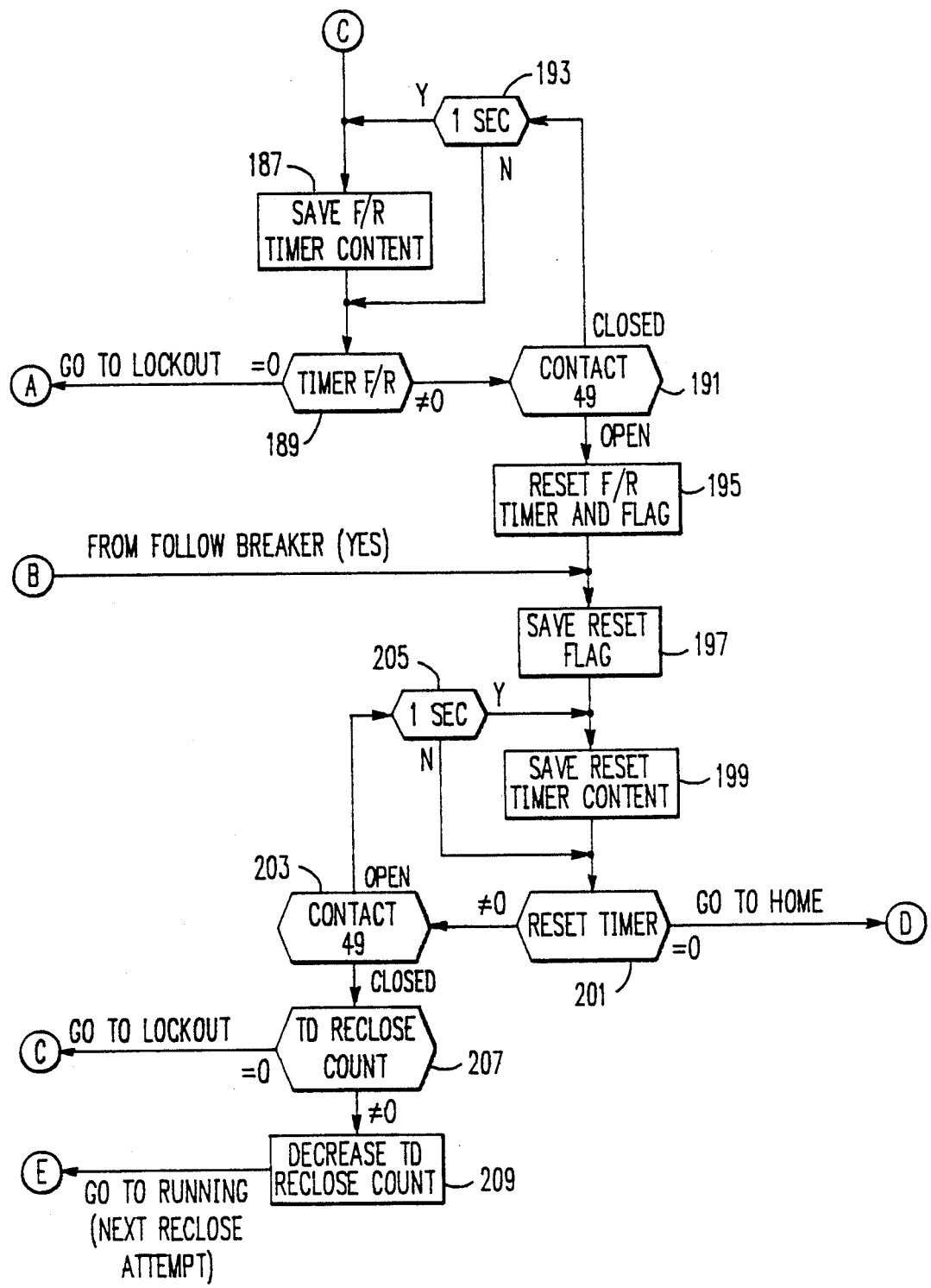

The flow chart for the reclosing sequence is shown in FIG. 5. First the RAM values are checked at 153. The microcomputer 17 copies the values of the parameters from the EEPROM and stores them in three separate locations in the RAM. The integrity of the data is confirmed before the reclosing sequence is initiated by checking to see that at least two out of three of the values stored in the RA1 for each parameter are the same, as determined at 155. If not, the alarm is set at 157 by deenergizing the K₃ relay and the system goes to LOCKOUT as indicated by the tags A in FIGS. 3 and 5. Upon entering LOCKOUT, the reclosure count is reset at 158 (see FIG. 3). If two out of three of the RAM values check, the third value is conformed at 159. If the max cycle timer has timed out, the system goes to LOCKOUT. If the relay is performing normally, the max cycle timer will not be timed out at 161 and the number of instantaneous trips remaining will be checked at 163. If instantaneous trips are remaining, the instantaneous trip counter is decremented at 165. If the preselected number of instantaneous trips have occurred, then the K₂ relay is deenergized at 167. In either case, the reclose flag is set and saved in the EEPROM at 169 and the count of the number of reclosures is saved in the EEPROM at 171. In addition, the reclose timer content is saved in the EEPROM at 173. The time delay reclose timer then begins to count down and the contents of the timer are checked at 175. While the reclose timer is timing out, the status of the circuit breaker is monitored at 177, and every second as determined at 179, the time remaining in the reclose timer is saved to the EEPROM at 173. Even if the circuit breaker opens, if the follow breaker function has not been selected as determined at 181, the reclose timer is permitted to time out and the time in the timer is saved to the EEPROM every second. If the follow breaker function has been selected, and the breaker closes on its own, the program advances to the reset sequence as indicated by the tag B. This is an antipumping feature which counts the self closures of the circuit breaker as one of the timed counts which will eventually cause the reclosing relay to go into lockout and prevent further closures of the circuit breaker if the circuit breaker does not remain closed.

When the timed delay reclose timer times out at 175, the close relay K₁ is energized at 183 and the failed to reclose flag is set and saved in the EEPROM at 185. The reclose sequence continues in FIG. 6, as shown by the tags C, by storing of the contents of the failed to reclose timer in the EEPROM at 187. While the failed to reclose timer is timing out at 189, the status of the circuit breaker is checked at 191. Every second, as determined at 193, the time remaining in the timer is saved to the EEPROM at 187. If the circuit breaker closes before the failed to reclose timer times out, the failed to reclose timer and flag are reset at 195 and the program enters the reset sequence. If the circuit breaker fails to reset reclose the interval determined by the failed to reclose timer, as determined at 189, the program goes to LOCKOUT.

When the circuit breaker closes either through operation of the reclosing relay, or on its own as detected by the follow breaker routine, the reset flag is set and saved in the EEPROM at 197 and the reset timer content is saved to the EEPROM at 199. While the reset timer is timing out at 201, the status of the circuit breaker is monitored at 203. The time remaining in the reset timer while the circuit breaker remains closed is saved in the EEPROM every second as determined at 205. If the circuit breaker remains closed for the interval set by the reset timer, the program goes to HOME as indicated by the tags D.

If the circuit breaker opens, as determined at 203, before the reset timer times out, the number of reclosures attempted is checked at 207. If the maximum number of reclosures have been attempted, the program goes to LOCKOUT as indicated by the tags C. If additional reclosures are available, the reclose counter is decremented at 209 and the program goes to the running routine, as indicated by the tags E, for the next reclosing attempt.

As can be seen from the above, the reclosing relay periodically stores the flags and timer and counter contents in the non-volatile EEPROM 21 so that if power to the microcomputer is interrupted and information in the non-volatile RAM 57 is lost, the reclosing relay can, upon restoration of power, resume operation at the point where it left off. The information is retained in the EEPROM indefinitely and thus is not dependent upon the life of a battery or the amount of charge that can be stored in the capacitor. Accordingly, the reclosing relay of the invention provides reliable operation even with prolonged power interruptions.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A reclosing relay for controlling reclosure of a circuit breaker from a tripped state to a closed state, said relay comprising:
   input means detecting the tripped and closed states of said circuit breaker;
   digital processing means generating, in response to the state of said circuit breaker as detected by said input means, a succession of a preset number of reclosure signals at selected reclosure timing intervals;
   volatile memory means in which are maintained working variables having dynamic values used by said digital processing means in generating said succession of reclosure signals at selected reclosure timing intervals;
   output means responsive to the generation of a reclosure signal by said digital processing means initiating reclosure of said circuit breaker to the closed state; and
   non-volatile memory means, said digital processing means selectively while generating said succession of reclosure signals copying the dynamic values of said variables in said volatile memory into said nonvolatile memory, and upon restoration of power following an interruption of power to the volatile memory means at a given point in said succession of reclosure signals, recopying the dynamic values of said variables from the nonvolatile memory means back and into the volatile memory means and using the dynamic values of of said variables recopied into the volatile memory means to continue generating said succession of reclosure signals from said given point in said succession.

2. The reclosing relay of claim 1 wherein said digital processing means generates a count of the number of reclosure signals generated and wherein said variables maintained in said volatile memory means and copied to said non-volatile memory means include said count of reclosure signals such that upon restoration of power following a power loss, the digital processing means resumes generating said count of the number of reclosure signals at the count recopied from the non-volatile memory means.

3. The reclosing relay of claim 1 wherein said digital processing means generates a reclosure interval running time for the selected interval for each reclosure signal and wherein said variables maintained in said volatile memory means and periodically copied to said non-volatile memory means include said reclose interval running time, such that upon restoration of power following a power loss while a reclosure interval running time is being generated, the digital processing means recopies the reclosure interval running time from said non-volatile memory means back into said volatile memory means and resumes generating said reclose interval running time from the reclose interval running time recopied from the nonvolatile memory means.

4. The reclosing relay of claim 3 wherein said digital processing means generates a count of the number of reclosure signals generated and wherein said variables maintained in said volatile memory means and copied to said non-volatile memory means include said count of reclosure signals such that upon restoration of power following a power loss, the digital processing means resumes generating said count of the number of reclosure signals at the count recopied from the non-volatile memory means.

5. The reclosing relay of claim 4 wherein said digital processing means begins generating a reset interval running time when said input means detects the closed state of said circuit breaker, said digital processing means indexing said count of the number of reclosure signals when said input means detects said circuit breaker returning to said tripped state before said reset interval running time reaches a predetermined reset interval, and said digital processing means restarting generation of said succession of a preselected number of reclosure signals when said reset interval running time reaches the predetermined reset interval with the circuit breaker remaining in the closed state, and wherein said variables maintained in said volatile memory means and periodically copied to said non-volatile memory means include said reset interval running time, such that upon restoration of power following a power loss while said reset interval running time is being generated, the digital processing means recopies the reset interval running time from said non-volatile memory means back into said volatile memory means and resumes generating said reset interval running time at the reset interval running time recopied from the non-volatile memory means.

6. The reclosing relay of claim 5 wherein said digital processing means generates a reclose flag when generating said reclose running time and a reset flag when generating a reset running time and wherein said variables maintained in said volatile memory means and copied to said non-volatile memory means include said flags such that when power is restored following a power loss, the digital processing unit recopies into said volatile memory means any flags in said non-volatile memory means and determines from recopied flags in said volatile memory means at what point in generating said succession of reclosure signals the power loss occurred and hence which running time to recopy into volatile memory means.

7. The reclosing relay of claim 6 wherein said digital processing means assumes a lockout state in which no reclose signals are generated when the input means detects the open state of the circuit breaker after the sequence of the preselected number of reclosure signals has been generated and the circuit breaker has not remained in the closed state for the reset interval, and wherein said variables maintained in said volatile memory means and copied to said non-volatile memory means include a flag signal indicating said lockout state, such that when power is restored following a loss of power with the digital processing means in the lockout state said digital processing means recopies said flag signal indicating said lockout state, and said digital processing unit reassumes said LOCKOUT state.

8. The reclosing relay of claim 7 wherein said digital processing means copies said flags and said count of the number of reclosure signals to the non-volatile memory means only when said flags and count change state, while the reclosure interval running time is only copied to said non-volatile memory at spaced intervals of time during timing.

9. The reclosing relay of claim 8 wherein said non-volatile memory means is an erasable electrically programmable read only memory (EEPROM), and wherein said spaced intervals of time are selected to provide a desired service life for said EEPROM.

10. A microprocessor based reclosing relay for reclosing a circuit breaker from a tripped state to a closed state, said relay comprising:
   input means detecting the tripped and closed states of said circuit breaker;
   digital processing means operated to perform a plurality of sequences identified by sequence flags to generate a preselected number of reclosure signals at timed intervals in response to detection by said input means of the tripped state of said circuit breaker, said sequences including implementation of counters having counts and timers having running times;
   volatile memory means in which said sequence flags, counts and running times are maintained during use by said digital processing means;
   output means responsive to generation of a reclosing signal by said digital processing means initiating reclosure of said circuit breaker to the closed state; and
   non-volatile memory means, said digital processing means, while generating said series of reclosing signals, copying said flags, counts and running times into said non-volatile memory, and upon restoration of power after a power loss to the non-volatile memory recopying the flags, counts and running times from said non-volatile memory back into the volatile memory, and resuming performance of said sequences with the sequence identified by the recopied flags and using the counts and running times recopied from said non-volatile memory.

11. The reclosing relay of claim 10 wherein said digital processing means copies said flags and counts into said non-volatile memory means only when said flags and counts change values, and copies said running times of said timers only at paced time intervals during running of said timers, with said spaced time intervals selected to provide a desired service life of said non-volatile memory means.

12. The reclosing relay of claim 9 wherein said non-volatile memory means comprises an erasable, electrically programmable read only memory (EEPROM), and wherein said spaced time intervals at which said running times of said timers are copied by said digital processing means into said EEPROM are intervals of a duration of about one second.

13. The reclosing relay of claim 11 wherein the sequence which said digital processing means performs include: a reclosing sequence in which a time delay timer times a selectable delay before generation of each reclosure signal, a reset sequence in which a reset timer times how long the circuit breaker remains in the closed state following reclosure in response to a reclosure signal and a reclosure counter counts the number of reclosure signals generated, a home sequence in which the digital processing means remains waiting for another indication from the input means of the circuit breaker returning to the tripped state and to which the digital processing means transfers from the reset sequence when said reset timer times out without the circuit breaker returning to the tripped state, and a lockout sequence in which no reclosure signals are generated and to which the digital processing means transfers from said reset sequence when the reclosure count indicates that said preselected number of reclosure signals have been generated and the circuit breaker returns to the tripped state before the reset timer times out.

14. The reclosing relay of claim 13 wherein said sequences performed by said digital processing means include a selectable power-up to lockout sequence in which said digital processing means goes to said lockout sequence when power is restored following an interruption of power rather than returning to the sequence indicted by said flags recopied from said non-volatile memory.

15. The reclosing relay of claim 14 wherein said power-up to lockout sequence includes transferring to said home sequence when said circuit breaker remains closed for a preselected time interval following restoration of power.

16. The reclosing relay of claim 15 wherein said reclosing sequence includes transferring to said reset sequence without waiting for said time delay timer to time out and without generating a reclosure signal when said input means detects said circuit breaker transferring to said closed state on its own, and wherein said reset sequence indexes the reclosure counter when the input means detects that the circuit breaker has returned to the tripped state before the reset timer of the reset sequence times out.

* * * * *